(12) United States Patent
Onishi et al.

(10) Patent No.: US 8,802,269 B2
(45) Date of Patent: Aug. 12, 2014

(54) FLAT NONAQUEOUS SECONDARY BATTERY

(75) Inventors: Yuko Onishi, Otokuni-gun (JP); Toshikazu Yoshiba, Otokuni-gun (JP); Megumu Takai, Otokuni-gun (JP)

(73) Assignee: Hitachi Maxell, Ltd., Ibaraki-shi (JP)

( * ) Notice: Subject to any disclaimer, the term of this patent is extended or adjusted under 35 U.S.C. 154(b) by 0 days.

(21) Appl. No.: 13/512,251

(22) PCT Filed: Nov. 24, 2010

(86) PCT No.: PCT/JP2010/070856
§ 371 (c)(1),
(2), (4) Date: May 25, 2012

(87) PCT Pub. No.: WO2011/065345
PCT Pub. Date: Jun. 3, 2011

(65) Prior Publication Data
US 2012/0276437 A1   Nov. 1, 2012

(30) Foreign Application Priority Data

Nov. 27, 2009  (JP) ................................. 2009-269701
Nov. 27, 2009  (JP) ................................. 2009-269702

(51) Int. Cl.
*H01M 2/18* (2006.01)
*H01M 2/02* (2006.01)

(52) U.S. Cl.
CPC .................................. *H01M 2/0222* (2013.01)
USPC ......................................... 429/139; 429/136

(58) Field of Classification Search
USPC ........................................................ 429/139
See application file for complete search history.

(56) References Cited

U.S. PATENT DOCUMENTS

2005/0132562 A1*  6/2005  Saito et al. .................... 29/623.5
2006/0024586 A1*  2/2006  Tamura et al. ................. 429/337

FOREIGN PATENT DOCUMENTS

| JP | 2001-291647 A | 10/2001 |
| JP | 03-045494 A | 2/2003 |
| JP | 03-092100 A | 3/2003 |
| JP | 2004-509443 A | 3/2004 |
| JP | 2007-250319 A | 9/2007 |
| JP | 2007250319 A * | 9/2007 |
| JP | 2008-091100 A | 4/2008 |
| WO | 02/25758 A1 | 3/2002 |

OTHER PUBLICATIONS

International Search Report of PCT/JP2010/070856, mailing date of Mar. 8, 2011.

* cited by examiner

*Primary Examiner* — Gary Harris
(74) *Attorney, Agent, or Firm* — Westerman, Hattori, Daniels & Adrian, LLP

(57) ABSTRACT

A flat nonaqueous secondary battery with improved reliability is provided. The flat nonaqueous secondary battery (1) includes an electrode assembly disposed in a space formed by an exterior case (2) and a seal case (3). The electrode assembly includes a plurality of positive electrodes (5) and a plurality of negative electrodes (6) alternately stacked upon each other and a separator (7). The separator (7) has a joint (7c) formed by welding together at least a portion of its periphery. When the separator (7) and the positive electrode (5) are measured along a cross section in their thickness direction, the ratio A/B of the shortest distance A between the end of the joint (7c) of the separator (7) facing the positive electrode (5) and the outer periphery of the positive electrode (5) sandwiched by the separator (7) to the thickness B of the positive electrode (5) is not smaller than 1.

14 Claims, 7 Drawing Sheets

(a)

(b)

US 8,802,269 B2

FLAT NONAQUEOUS SECONDARY BATTERY

TECHNICAL FIELD

The present invention relates to a flat nonaqueous secondary battery with improved reliability.

BACKGROUND ART

Flat nonaqueous secondary batteries, often referred to as coin cells or button cells, generally include an electrode complex with positive and negative electrodes stacked upon each other and separated by a separator, and nonaqueous electrolyte, both contained in a space formed by an exterior case and a seal case.

A known flat nonaqueous secondary battery of the above configuration includes positive and negative electrodes that each have a current collector with a positive or negative compound layer on one side or such layers on both sides, where a portion of each current collector has no positive or negative compound layer upon it and thus is exposed to be used as a current collector tab. In such a flat nonaqueous secondary battery, such a current collector tab may be used to establish electrical connection between the collector and an exterior case or a seal case, both of which each serve as an electrode and terminal, as well.

An electrode assembly is known in which a positive electrode with such a configuration, inserted into a separator bag, and a negative electrode are stacked upon each other (for example, JP2004-509443A or JP2008-91100A). This separator bag is formed by disposing an insulating polymer film such as a polyester resin film having an adhesive on its surface between two separators and allowing the film to adhere to the separators using this adhesive (for example, JP2004-509443A), or welding the two separators together (for example JP2008-91100A).

DISCLOSURE OF THE INVENTION

If such a separator bag is formed by laying two separators upon each other to sandwich a positive electrode and then join the peripheries of these separators together using pressing or hot pressing, a corner of an end of the positive electrode (i.e. a corner of an end of a positive electrode compound layer) abuts the inner surface of a separator. This may cause a bruise on the separator or cause the corner of the positive electrode compound layer to chip off. Such problems may cause an interior short circuit or decreased capacity of the battery, impairing the reliability of the battery. As such, in a flat nonaqueous secondary battery having such a separator bag, there is a need for minimizing such problems.

The present invention was made in view of the above circumstances. An object of the present invention is to provide a flat nonaqueous secondary battery with improved reliability.

A flat nonaqueous secondary battery according to an embodiment of the present invention includes an electrode assembly disposed in a space formed by an exterior case and a seal case, the electrode assembly including: a plurality of positive electrodes and a plurality of negative electrodes alternately stacked upon each other, and separators made of microporous membrane of a thermoplastic resin, each of the separators being located between one of the positive electrodes and one of the negative electrodes, each separator being disposed to sandwich and cover one of the positive electrodes, the separator as sandwiching the positive electrode having a joint formed by welding together at least a portion of a periphery of the separator, wherein, when the separator and the positive electrode are measured along a cross section in their thickness direction, a ratio A/B of a shortest distance A between an inner end of the joint of the separator, the end facing the positive electrode, and an outer peripheral surface of the positive electrode sandwiched by the separator to a thickness B of the positive electrode is not smaller than 1.

In the battery industry, a flat battery with a diameter greater than its height is referred to as a coin cell or button cell. However, there is no clear distinction between a coin cell and a button cell. As such, a flat nonaqueous secondary battery of the present invention includes both a coin cell and a button cell.

An embodiment of the present invention provides a flat nonaqueous secondary battery with improved reliability.

EMBODIMENTS FOR CARRYING OUT THE INVENTION

Figure 1:
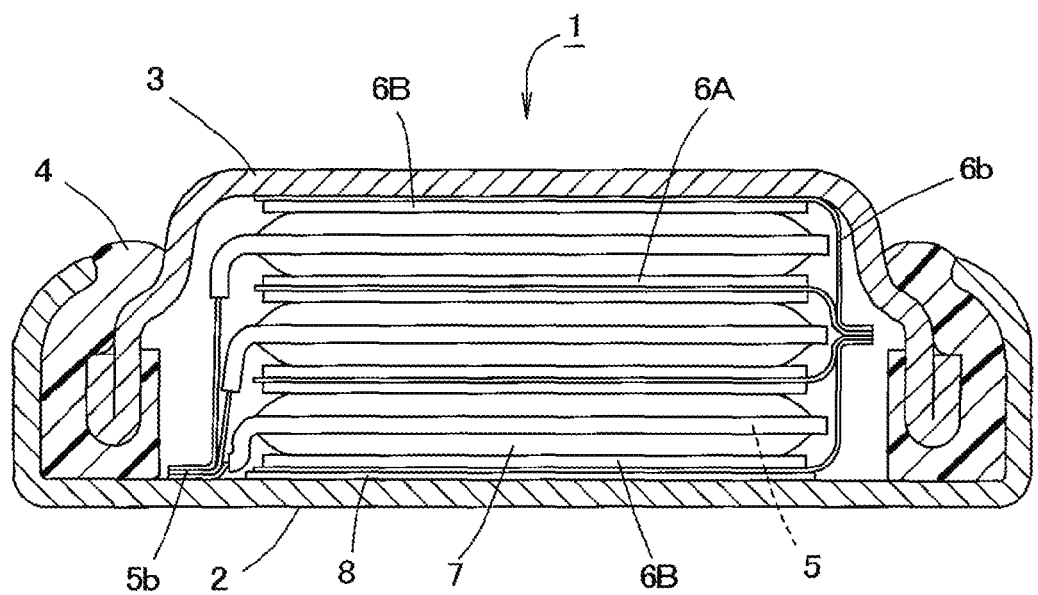
FIG. 1 is a schematic vertical cross-sectional view of an example of a flat nonaqueous secondary battery according to an embodiment of the present invention.
Figure 2:
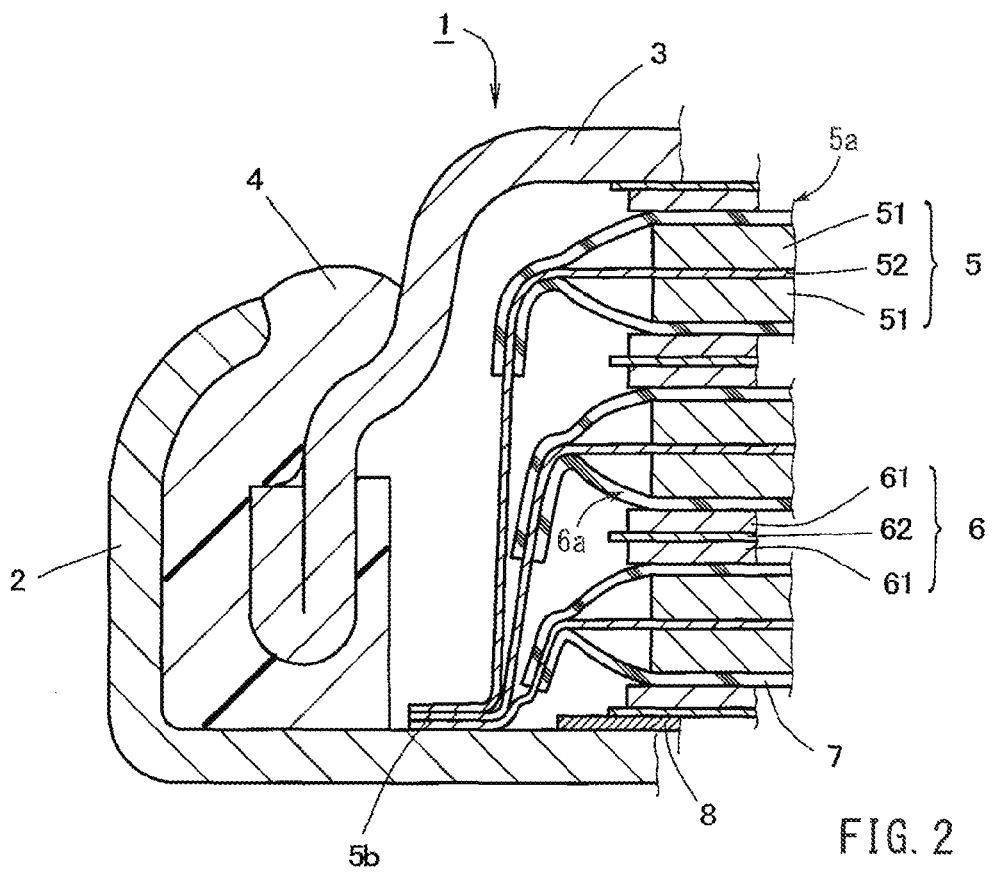
FIG. 2 is a partial enlarged cross-sectional view from FIG. 1.

FIGS. 1 and 2 schematically show an example of a flat nonaqueous secondary battery according to an embodiment of the present invention. FIG. 1 is a vertical cross-sectional view of a battery case (consisting of an exterior case 2 and seal case 3) of the flat nonaqueous secondary battery 1 (hereinafter also referred to as "battery") and an insulating gasket 4. FIG. 2 is an enlarged view of a portion from FIG. 1 and is a cross section of the electrode assembly. As shown in FIGS. 1 and 2, the flat nonaqueous secondary battery 1 includes an assembly of stacked electrodes, in which positive electrodes 5 and negative electrodes 6 are stacked upon each other such that their planes are generally parallel (including parallel) to the flat plane of the battery (i.e. the top or bottom surface in FIG. 1), and nonaqueous electrolyte (not shown) contained in a space (enclosed space) formed by the exterior case 2, seal case 3 and insulating gasket 4.

The seal case 3 fits within the opening of the exterior case 2 with the insulating gasket 4 sandwiched between the seal case and the exterior case 2. The opening edge of the exterior case 2 is deformed toward the interior of the battery. Thus, the insulating gasket 4 is sandwiched between the seal case 3 and exterior case 2 such that the opening of the exterior case 2 is sealed up to form an enclosed space in the interior of the battery. The exterior case 2 and seal case 3 are made of a metal material such as stainless steel. The insulating gasket 4 is made of an insulating resin such as nylon.

Figure 3:
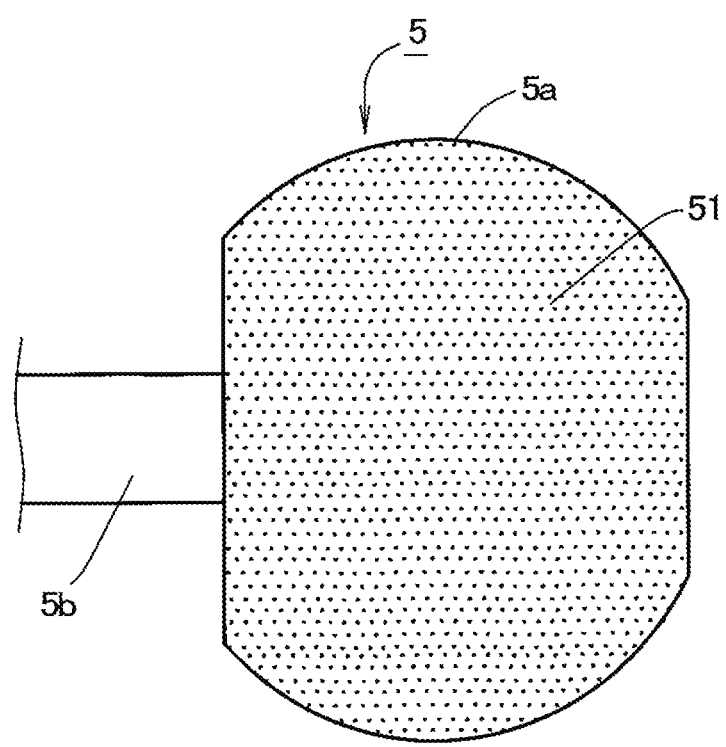
FIG. 3 is a schematic plan view of an example of a positive electrode of the flat nonaqueous secondary battery according to an embodiment of the present invention.

As shown in FIGS. 1 and 2, each positive electrode 5 includes a current collector 52 plate and a positive electrode compound layer 51 formed on one side, or such layers formed on both sides, of the current collector 52. FIG. 3 shows a schematic plan view of a positive electrode 5. The positive electrode 5 includes a body 5a (positive electrode body) and a current collector tab 5b (positive electrode current collector tab) protruding from the body 5a in planar view and having a width (i.e. a top-to-bottom length in FIG. 3) smaller than the body 5a.

As shown in FIG. 2, the body 5a of a positive electrode 5 is constructed by forming a positive electrode compound layer 51 on one side, or such layers on both sides, of the current collector 52. The current collector tab 5b of the positive electrode 5 has no positive electrode compound layer 51 formed on the surface(s) of the current collector 52 such that the current collector 52 is exposed here.

As shown in FIGS. 1 and 2, each negative electrode 6 includes a current collector 62 plate and a negative electrode material layer 61 formed on one side, or such layers on both sides, of the current collector 62. Similar to the positive electrodes 5, the negative electrodes 6 each include a body 6a and a current collector tab 6b protruding from the body 6a in planar view and having a width smaller than the body 6a. Hereinafter, a negative electrode with negative electrode material layers 61 on both sides of the current collector 62 will be described as a negative electrode 6A, while a negative electrode with a negative electrode material layer 61 on only one side of the current collector 62 will be described as a negative electrode 6B (see FIG. 1).

The body 6a of a negative electrode 6 is constructed by forming a negative electrode material layer 61 on one side, or such layers on both sides, of the current collector 62. The current collector tab 6b of a negative electrode 6 has no negative electrode material layer 61 on the surface(s) of the current collector 62 such that the current collector 62 is exposed here.

As shown in FIG. 1, in the flat nonaqueous secondary battery 1 of the present embodiment, the top and bottom of the electrode assembly are negative electrodes 6B, 6B. The negative electrodes 6B, 6B are disposed in the battery such that the negative electrode material layer 61 of each electrode is located on the side of the current collector 62 that faces the interior of the battery. The exposed side of the current collector 62 of the negative electrode 6B located at the top in FIG. 1 is welded to, or in contact with, the inner surface of the seal case 3 such that the seal case 3 is electrically connected to the negative electrode 6B. In other words, in the flat nonaqueous secondary battery 1 of the present embodiment, the seal case 3 also serves as a negative terminal.

The negative electrodes 6 (i.e. the negative electrodes 6A each having negative electrode material layers 61 on both sides of the current collector 62 and the negative electrodes 6B each having a negative electrode material layer 61 on one side of the current collector 62) are electrically connected with each other at the current collector tabs 6b, as shown in FIG. 1. The current collector tabs 6b of the negative electrodes 6 may be connected with each other using welding, for example.

For the positive electrodes 5, as shown in FIGS. 1 and 2, the current collector tabs 5b are electrically connected with each other. The connected current collector tabs 5b are welded to, or in contact with, the inner surface of the exterior case 2 such that the exterior case 2 is electrically connected to the positive electrodes 5. That is, in the flat nonaqueous secondary battery 1 of the present embodiment, the exterior case 2 also serves as a positive terminal. An insulating seal 8 made of polyethylene terephthalate (PET) or polyimide is disposed between the negative electrode 6B at the bottom of the electrode assembly and the exterior case 2 that also serves as a positive terminal to separate them.

Figure 4:
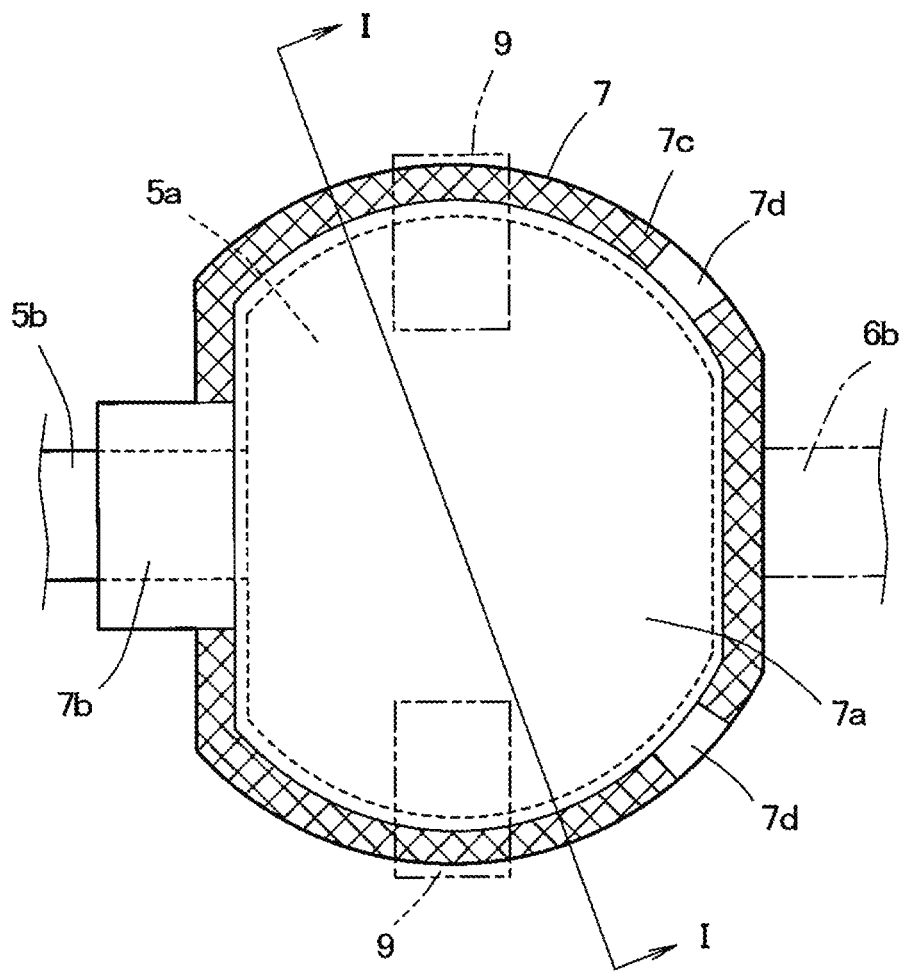
FIG. 4 is a schematic plan view of an example of a separator of the flat nonaqueous secondary battery according to an embodiment of the present invention.

As shown in FIGS. 1 and 2, for each positive electrode 5, the body 5a and a portion of the current collector tab 5b are covered with a pair of separators 7 made of microporous membrane of a thermoplastic resin. FIG. 4 shows a schematic plan view of a separator 7. FIG. 4 presupposes an assembly of stacked electrodes in which positive electrodes 5 covered with separators 7 and negative electrodes 6 are stacked upon each other, where a positive electrode 5 covered with separators 7 is suggested by a dotted line and the current collector tab 6b of a negative electrode 6 disposed below them is suggested by one-dot chain lines. In FIG. 4, a binding tape 9 for preventing positional displacement of the components of the electrode assembly is suggested by two-dot chain lines. Although not shown, in the present embodiment, negative electrodes are positioned such that two adjacent ones sandwich a positive electrode 5. As such, in the assembly partially shown in FIG. 4, another negative electrode is disposed on top of the separator 7 (i.e. located closer to the viewer of the drawing).

A separator 7 is welded to another separator 7 located on the other side of the positive electrode 5 (suggested by the dotted line in the drawing) at their peripheries. Thus, the two separators 7 form a bag-like member that can contain the positive electrode 5 in its interior. Specifically, as shown in FIG. 4, the two separators 7 sandwiching the positive electrode 5 are welded to each other at their peripheries to form a joint 7c (i.e. a grid-hatched portion in FIG. 4).

Each separator 7 includes a main body 7a covering the entire surface of the body 5a of a positive electrode 5 and an overhang 7b that protrudes from the main body 7a to cover the boundary of the current collector tab 5b of the positive electrode 5 with the body 5a. The main body 7a has an area larger than that of the body 5a of the positive electrode 5 to cover the body 5a in planar view. At least a portion of the periphery of the main body 7a constitutes the joint 7c.

In the present embodiment, as discussed above, a joint 7c that joins two separators 7 disposed on the two sides of a positive electrode 5 is provided at the periphery of the main body 7a of each of the separators 7. In addition, a joint may be provided at the periphery of the overhang 7b of each of the separators 7 (i.e. in those portions of the periphery of the overhang 7b of each separator 7 that are parallel to the direction of protrusion thereof from the main body 7a).

In the present embodiment, the joint 7c is formed by directly welding together the peripheries of the main bodies 7a of the two separators 7. Alternatively, a joint may be formed by interposing a layer made of a thermoplastic resin between the two separators 7, which is used to weld the two separators 7 together. However, in the latter implementation, some thermoplastic resins forming the layer interposed between the separators 7 and some thermoplastic resins forming the separator 7 may result in reduced strength of the joint. Therefore, it is preferable that the layer interposed between the separators 7 is made of the same resin as the thermoplastic resin forming the separators 7.

Thus, directly welding separators 7 together or welding separators 7 together with an interposed layer made of the same thermoplastic resin as the resin forming the separators 7 results in a strength of the joint that is substantially the same as that of the separators themselves. This will effectively prevent the separators 7 from being breaking at the joint due to vibrations when the battery is used, for example, thereby providing a battery with further improved reliability.

If two separators 7 are to be directly welded together to form a joint 7c, for example, a positive electrode 5 may be placed over one separator 7 and then another separator 7 may be placed over the positive electrode before the peripheries of the two separators 7 are welded together. Alternatively, two separators 7 may be stacked upon each other and their peripheries may be welded together to join the separators 7 before a positive electrode 5 is inserted between the separators 7.

If a layer made of the same resin as the resin forming the two separators 7 is to be interposed between the separators 7 and these resins are welded together to form a joint 7c, the following methods are possible. For example, film for such a layer may be placed at a location on one separator 7 that is to become a joint 7c and a positive electrode 5 may be placed on the main body 7a of the separator 7, and then another separator 7 may be placed thereon before the peripheries of the separators 7 are welded together. Alternatively, film for such a layer may be placed at a location on one separator 7 that is to become a joint 7c and the film may be welded to the separator 7, and then a positive electrode 5 and another separator 7 may be placed in this order and their peripheries may be welded together. Still alternatively, film for such a layer may be placed between two separator 7 and the separators 7 may be welded together to form a joint 7c before a positive electrode 5 may be inserted between the separators 7.

The peripheries of the separators 7 may be welded together using hot pressing, for example. In this case, the heating temperature is suitably higher than the melting temperature of the thermoplastic resin forming the separators 7. For example, it is preferable that hot pressing is performed at a temperature 10° C. to 50° C. higher than the melting temperature of the thermoplastic resin. Although the time for hot pressing is not limited to any particular amount as long as it allows a joint to be suitably formed, it may preferably be in the range of 1 to 10 seconds.

In the present embodiment, a joint 7c is provided along a portion of the periphery of the main body 7a of each separator 7. However, all the periphery of the main body 7a of each separator 7 may form a joint 7c. If a joint 7c is provided only along a portion of the periphery of the main body 7a of each separator 7 as in the present embodiment, some portions of the periphery of each of the separators may not be welded and be left as unwelded portions 7d and 7d, as shown in FIG. 4. For example, if two separators 7 are welded together to form a bag and a positive electrode 5 is contained therein, or if a positive electrode 5 is placed over one separator 7 and another separator 7 is placed over the positive electrode 5 and the peripheries of the separators 7 are welded together to form a bag, air may remain in the bag-like member formed by the separators 7. Even if this is the case, with unwelded portions 7d above being provided, the separators 7 are pressed together between a positive electrode 5 and a negative electrode 6 when the exterior case 2 and the seal case 3 are swaged together, thereby allowing remaining air to be effectively discharged to the outside of the separators 7 through the unwelded portions 7d and 7d. This prevent problems due to remaining air in the separators (for example, uneven reaction during power generation, which may result in decreased capacity).

Thus, if at least one unwelded portion 7d is provided along the periphery of each separator 7, it is preferable that the number of the unwelded portions 7d is one (1) to five (5) so as to minimize the decrease in the productivity of the battery 1. Further, if an unwelded portion 7d is provided along the periphery of each separator 7, it is preferable that the length of the outer edge of the unwelded portion 7d for the main body 7a of each separator 7 is in the range of 15% to 60% of the entire length of the edge of the main body 7a of each separator 7 (or the entire length of the edge except for the overhang). Further, it is preferable that not smaller than 40% (preferably 70%) of the entire length of the edge of the main body 7a of the separator 7 forms a joint. This will effectively ensure a joint strength of the separators 7.

Figure 5:
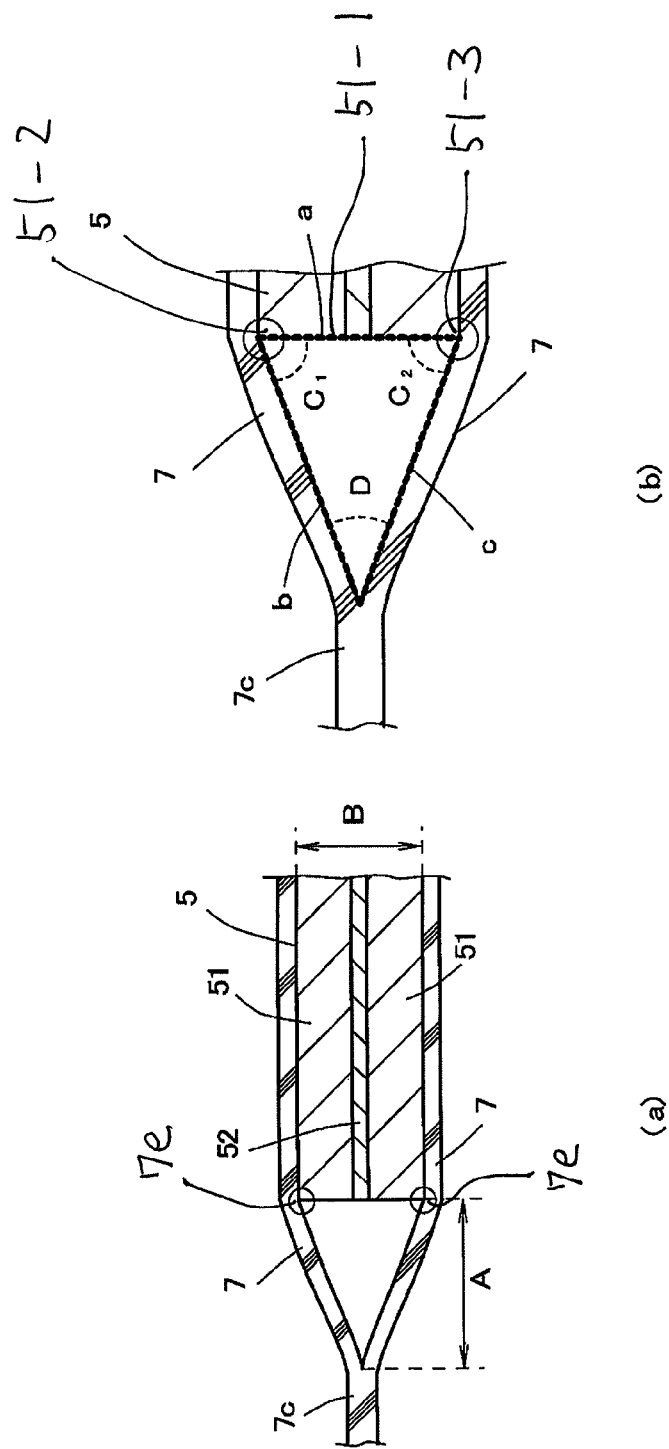
FIG. 5 illustrates partial schematic cross sections of a positive electrode and a pair of separators, disposed on its two sides, of the flat nonaqueous secondary battery shown in FIGS. 1 and 2.

FIG. 5 shows partial schematic cross sections of a positive electrode 5 (or the body 5a of a positive electrode 5) of the flat nonaqueous secondary battery 1 and a pair of separators 7 (or the main bodies 7a of a separators 7) disposed on the two sides of the positive electrode. Specifically, FIG. 5(a) is a partial cross section of the positive electrode 5 and the separators 7, and FIG. 5(b) is an enlarged view of a portion of FIG. 5(a). The cross sections shown in FIG. 5 each depict a portion of the cross section taken on line I-I (including the joint 7c) of FIG. 4, for example. In FIG. 5, the shortest distance between the inner end of the joint 7c of the two separators 7 (i.e. the end facing the positive electrode 5) and the edge (periphery) of the body 5a of the positive electrode 5 present between the two separators 7 is represented by A (μm) and the thickness of the positive electrode 5 is represented by B (μm).

For example, if a positive electrode 5 is placed on one separator 7 and then another separator 7 is placed thereon before the peripheries of the separators 7 are welded together using hot pressing, for example, to form a joint 7c, corners of the positive electrode compound layers 51 of the positive electrode 5 (portions indicated by circles in FIG. 5(a)) abut the inner surfaces of the separators 7. In this case, the angle (inner angle) by which the top separator 7 in FIG. 5 turns toward bottom left in FIG. 5 due to a corner of an edge of the positive electrode 5 (i.e. an edge of the body 5a) and the angle (inner angle) by which the bottom separator 7 in FIG. 5 turns toward top left in FIG. 5 due to the other corner of the edge of the positive electrode 5 (i.e. the edge of the body 5a) significantly affect the reliability of the battery 1. Specifically, if these angles are relatively small, a bruise may occur on the inner surface of a separator 7 where a corner of a positive electrode compound layer 51 abuts the inner surface of the separator 7 (indicated by a circle in FIG. 5), or a corner of the positive electrode compound layer 51 may chip off. In other words, if the thickness B of the positive electrode 5 is greater than the shortest distance A between the inner end of the joint 7c of the separators 7 and the body 5a of the positive electrode 5, each separator 7 bends in a biting manner on the corner of its positive electrode 5 at the abutting location. This increases stress concentration at the abutting location, possibly causing a damage to a separator 7 or causing the corner of a positive electrode compound layer 51 to chip off. As shown in FIG. 5(b), the positive electrode 5 has an outer peripheral surface 51-1 with an upper periphery 51-2 and a lower periphery 51-3. As shown in FIG. 5(a), the separator 7 includes a portion 7e contacting the upper periphery 51-2 and the lower periphery 51-3 of the positive electrode.

In view of this, in the present embodiment, a flat nonaqueous secondary battery 1 is constructed such that the A/B value, which represents the ratio of A to B, is not smaller than 1, preferably not smaller than 1.7. This will increase the inner angle formed by the inner surface of a separator 7 that a corner of a positive electrode compound layer 51 abuts at the abutting location. This will prevent the inner surface of the separator 7 from being pressed hard against the corner of the positive electrode compound layer compound layer 51 in a biting manner. Consequently, a bruise on the inner surface of the separator 7 or a chip-off of the corner of the positive electrode 51 may be prevented. Thus, the above configuration will prevent an internal short circuit that could be caused by a damage to the separator 7 or a decrease in capacity that could be caused by a chip-off of the positive electrode compound layer 51, thereby improving the reliability of the flat nonaqueous secondary battery 1.

However, if the A/B value is too large, the area of the main body 7a of a separator 7 that is not in contact with the body 5a of a positive electrode 5 (i.e. the area protruding from the body 5a) is relatively large. Then, the volume occupied by the separators 7 in the battery 1 is increased, resulting in a decrease in the capacity of the battery 1. In view of this, a positive electrode 5 and separators 7 are constructed such that the A/B value is not greater than 5, preferably not greater than 2.7.

Therefore, in the flat nonaqueous secondary battery 1 of the present embodiment, a positive electrode 5 and separators 7 are provided such that the ratio of A to B, i.e. A/B, is not smaller than 1, preferably not smaller than 1.7, and not greater than 5, preferable not greater than 2.7.

In the cross sections shown in FIG. 5, as shown in FIG. 5(b), a space with a triangular cross section is formed between a pair of separators 7 and a positive electrode 5 at the two corners of the edge of the body 5a of the positive electrode 5 and the inner end of the joint 7c of the separators 7. That is, this space with a triangular cross section is formed between the end of the joint 7c of the separators 7 facing the positive electrode 5 and the periphery of the body 5a of the positive electrode 5. More specifically, as shown in FIG. 5(b), the space with a triangular cross section is formed by the side "a" connecting the corners of the edge of the body 5a of the positive electrode 5, the side "b" connecting the top corner, as viewed in FIG. 5(b), of the edge of the body 5a with the inner end of the joint 7c of the separators 7, and the side "c" connecting the bottom corner, as viewed in FIG. 5(b), of the edge of the body 5a with the inner end of the joint 7c. The side "a" extends in the thickness direction of the positive electrode 5 along the periphery of the body 5a of the positive electrode 5, and the side "b" connects one end in the thickness direction of the periphery of the positive electrode 5 with the end of the joint 7c of the separators 7 facing the positive electrode 5. The side "c" connects the other end of the periphery of the positive electrode 5 in the thickness direction with the end of the joint 7c of the separators 7. It should be noted that in FIG. 5(b), the sides of the triangle are suggested by dotted lines and the depiction of the surfaces of the separator 7 and the edge of the positive electrode 5 that are present in this area is omitted.

In such a triangle, it is preferable that the inner angle $C_1$ formed by the sides "a" and "b" and the inner angle $C_2$ formed by the sides "a" and "c" are not smaller than 45°, and more preferably not smaller than 60°. Still more preferably, the inner angles $C_1$ and $C_2$ are not smaller than 90° and, more preferably, not greater than 125°. A positive electrode 5 and a pair of separators 7 may be provided to form such inner angles $C_1$ and $C_2$ to ensure improved reliability and prevention of decrease in capacity, as discussed above, more effectively. The inner angles $C_1$ and $C_2$ may be the same or may be different.

To ensure improved reliability and prevention of decrease in capacity, as discussed above, more effectively, it is preferable that, in such a triangle, the inner angle D formed by the sides "b" and "c" is not greater than 55°, and more preferably, not greater than 45°. More preferably, the inner angle D is not greater than 30°. Further, the inner angle D is preferably not smaller than 10°, and more preferably not smaller than 20°.

The A/B value, inner angle $C_1$, inner angle $C_2$ and inner angle D may be regulated by changing the magnitude of A and the thickness of the positive electrode (i.e. the magnitude of B). The magnitude of A may be regulated by adjusting the size of the separators 7 and positive electrode 5.

Figure 6:
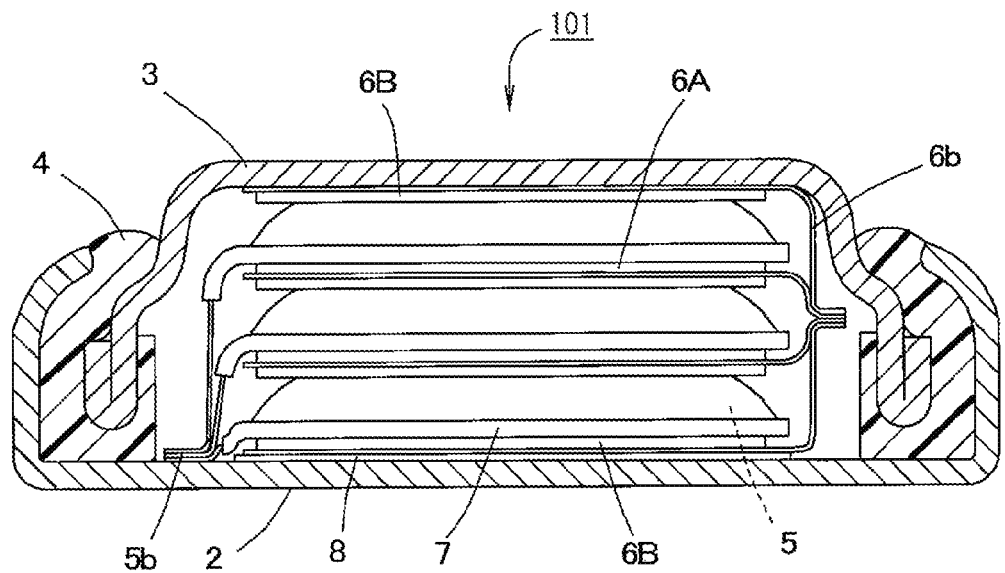
FIG. 6 is a schematic vertical cross-sectional view of another example of a flat nonaqueous secondary battery.
Figure 7:
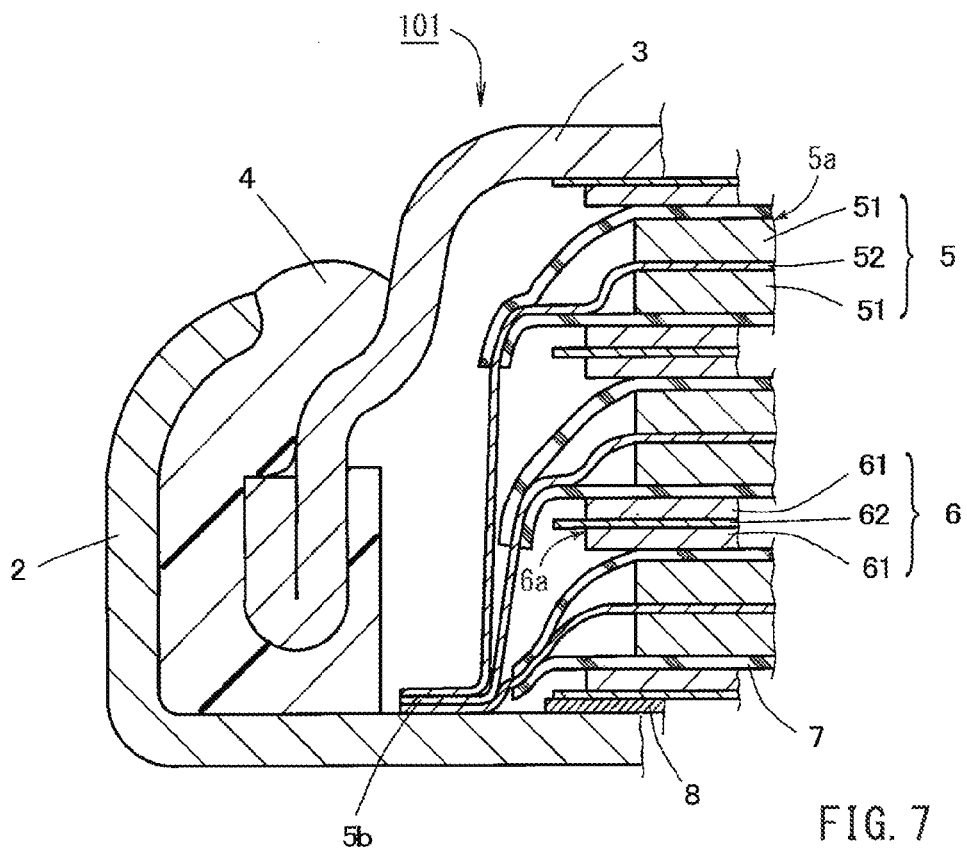
FIG. 7 is a partial enlarged cross-sectional view from FIG. 6.
Figure 8:
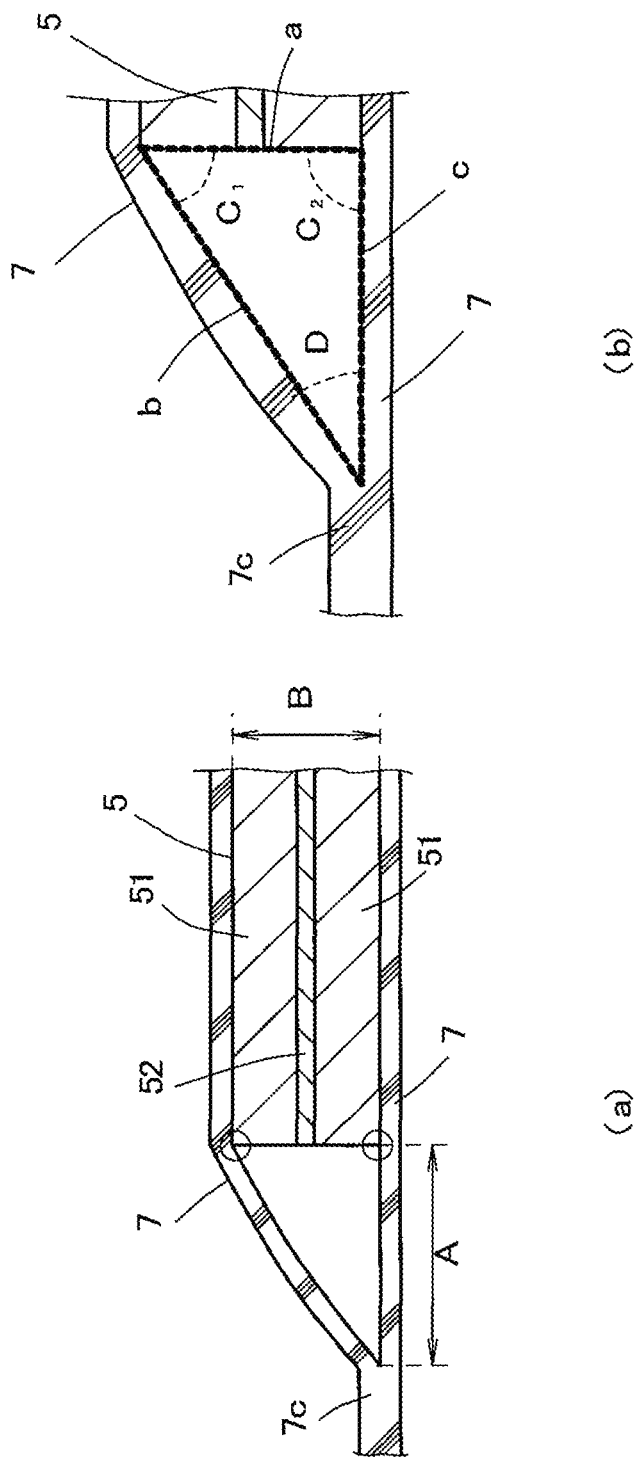
FIG. 8 illustrates partial schematic cross sections of a positive electrode and a pair of separators, disposed on its two sides, of the flat nonaqueous secondary battery shown in FIGS. 6 and 7.

FIGS. 6 to 8 schematically show another example of the flat nonaqueous secondary battery. FIG. 6 is a vertical cross-sectional view of a battery case (consisting of an exterior case 2 and a seal case 3) and an insulating gasket 4 of the flat nonaqueous secondary battery 101, and FIG. 7 is an enlarged cross-sectional view of a portion of the electrode assembly of FIG. 6. FIG. 8(a) is a partial cross-sectional view of a positive electrode 5 (or the body 5a of a positive electrode 5) of the battery 101 shown in FIGS. 6 and 7 and a pair of separators 7 (or the main bodies 7a of separators 7) disposed on the two sides thereof. FIG. 8(b) is an enlarged view of a portion from FIG. 8(a). The cross sections shown in FIGS. 8(a) and 8(b) each depict a portion of the cross section taken on line I-I in FIG. 4 (including the joint 7c), for example, for the flat nonaqueous secondary battery 101. In the description below, the components similar in construction to those of the flat nonaqueous secondary battery 1 shown in FIG. 1 are labeled with the same numerals, and their description will be omitted.

In the flat nonaqueous secondary battery 101, as shown in FIGS. 6 to 8, the main body 7 of one of the two separators 7 (the bottom separator 7 in the example of FIGS. 6 to 8) disposed on their respective sides of a positive electrode 5 is generally parallel (including parallel) to the top and bottom surfaces of the positive electrode 5, which is in the form of a plate (i.e. planes of the positive electrode 5). That is, in this example, either the inner angle $C_1$ or the inner angle $C_2$ is 90°.

In this configuration, as shown in FIG. 8, the bottom separator 7 (closer to the exterior case 2) forms a very large inner angle of the separator 7 that the corner of the positive electrode compound layer 51 abuts at the location where the positive electrode compound layer 51 abuts the separator 7 (enclosed by a circle in FIG. 8(a)). This will prevent more effectively a damage to the inner surface of a separator 7 that could be caused by a contact of the separator 7 with a positive electrode compound layer 51, or a chip-off of a corner of a positive electrode compound layer 51. Thus, the reliability of the battery may be further improved.

In the flat nonaqueous secondary battery 101 shown in FIGS. 6 to 8, components other than those discussed above are similar in construction to those of the flat nonaqueous secondary battery 1 shown in FIG. 1. However, it is preferable that, in the flat nonaqueous secondary battery 101, the inner angle D is not greater than 45°, and more preferably not greater than 30°. Further, it is preferable that the inner angle D is not smaller than 10°, and more preferably not smaller than 20°.

Furthermore, in the flat nonaqueous secondary battery 101 shown in FIGS. 6 to 8, out of the separators 7 of the electrode assembly each having a joint 7c (i.e. pairs of separators 7 welded together at at least a portion of the periphery of each main body 7a), the separators 7 extending straight and generally parallel to the positive electrodes 5 are located closer to either the exterior case 2 or the seal case 3 than their counterparts.

Specifically, out of the plurality of positive electrodes 5 forming the electrode assembly, each of the positive electrodes 5 with each side (each face) facing a negative electrode 6 has two separators 7 disposed on its two sides. Out of these separators 7, one group of separators 7 (or their main bodies 7a) are generally parallel to the positive electrodes 5. The electrode assembly is constructed such that each of the separators 7 that are generally parallel to the positive electrodes 5 are located on the side of its positive electrode that is closer to the exterior case 2 or seal case 3.

Such a configuration will allow nonaqueous electrolyte to seep well between the electrodes of the electrode assembly. This will make reaction at each electrode homogeneous, thereby providing a battery with improved reliability.

Further, such a configuration will prevent the separators 7 from bending over. This will be specifically illustrated below with reference to FIGS. 9(a) and 9(b).

Figure 9:
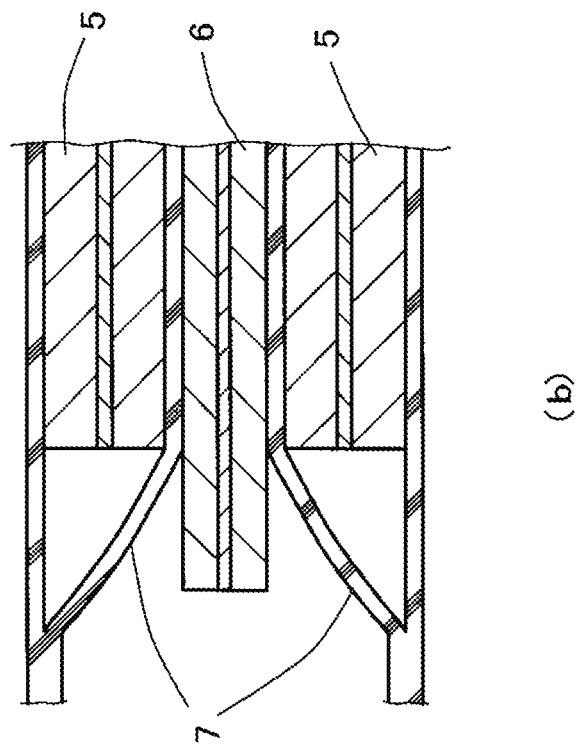
FIG. 9 illustrates partial enlarged cross sections of implementations where (a) separators extending generally parallel to the positive electrodes are located toward one side of the electrode assembly, and (b) separators extending generally parallel to the positive electrodes are located toward different sides of the electrode assembly.
Figure 9:
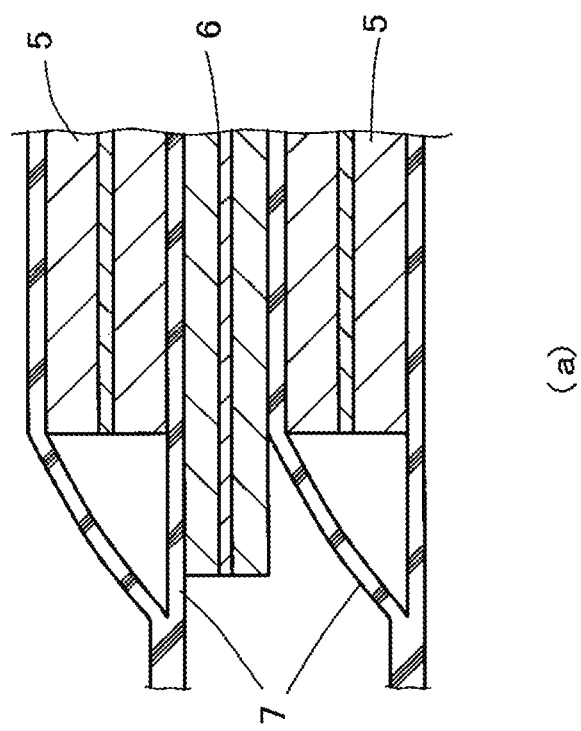

FIG. 9(a) shows an implementation where electrodes are constructed such that the separators 7 that are generally parallel to the positive electrodes 5 are located on the same side of their respective positive electrodes. Further, FIG. 9(b) shows an implementation where an electrode assembly is constructed such that the separators 7 that are generally parallel to the positive electrodes 5 are located on different sides of their respective positive electrodes.

In the configuration shown in FIG. 9(b), some separators 7 that are not generally parallel to the positive electrodes 5 are located on each side of a negative electrode 6, increasing the gap in the vicinity of the periphery of the negative electrode 6. Thus, the separators 7 may bend over at the periphery of the negative electrode 6, resulting in reduced reliability of the battery.

On the contrary, as shown in FIG. 9(a), each of the separators 7 that are generally parallel to the positive electrodes 5 may be located on the same side of its positive electrode such that each of the separators 7 that are generally parallel to the positive electrodes 5 is located on one side of its negative electrode 6. This will minimize the gap in the vicinity of the periphery of a negative electrode 6, thereby preventing a separator 7 from bending over at the periphery of a negative electrode 6. Thus, the reliability of the battery may be improved.

In the flat nonaqueous secondary battery 1 shown in FIGS. 1 and 2 and the flat nonaqueous secondary battery 101 shown in FIGS. 6 and 7, the electrodes located at the top and bottom of the electrode assembly (i.e. the two outermost electrodes) are negative electrodes 6. However, one or both of the top and bottom electrodes of the electrode assembly (i.e. the two outermost electrodes) may be a positive electrode(s) 5. Further, if the one of the outermost electrodes of the electrode assembly that is close to a battery case that also serves as a positive electrode terminal (for example, the exterior case 2) is a positive electrode 5, the positive electrode 5 may have a positive electrode compound layer 51 on each side of its current collector 52 and be in contact with the battery case (for example, the exterior case 2) that also serves as a positive electrode terminal at its current collector tab 5b. Alternatively, in the implementation discussed above, the positive electrode 5 may have a positive electrode compound layer 51 on only one side of its current collector 52 (the side located inwardly in the battery) and electrical connection may be established between the positive electrode 5 and the exterior case 2 by welding an exposed surface of the current collector 52 to, or bring it into contact with, the inner surface of a battery case that also serves as a positive electrode terminal (for example, the exterior case 2).

If both of the top and bottom electrodes of the electrode assembly (i.e. the two outermost electrodes) are positive electrodes 5, the current collector tabs 6b of the negative electrodes 6 may be electrically connected with each other and the current collector tabs 6b may be welded to, or brought into contact with, the inner surface of a battery case that also serves as a negative electrode terminal (for example, the seal case 3) to establish electrical connection between the battery case and the negative electrodes 6.

In the present embodiment, a separator 7 is disposed on each side of a positive electrode 5 with each side facing a negative electrode 6. However, the positive electrode located outermost of the electrode assembly, i.e. the positive electrode with only one side (one face) facing a negative electrode need not have a separator on each side, i.e. may have a separator only on the side facing a negative electrode. Furthermore, if both electrodes located outermost of the electrode assembly are positive electrodes and the positive electrodes do not have a separator on each side, an insulator such as an insulating seal made of polyethylene terephthalate (PET) or polyimide is disposed between a battery case that also serves as a negative electrode and each of these positive electrodes.

Electrical connection between the current collector tabs 5b of the positive electrodes 5 and a battery case that also serves as a positive electrode terminal, and electrical connection between the current collector tabs 6b of the negative electrodes 6 and a battery case that also serves as a negative electrode terminal may be established via a lead that is not integral with the positive electrodes 5 or negative electrodes 6 (a lead made of metal foil).

In the present embodiment, each positive electrode compound layer 51 of a positive electrode 5 contains a positive electrode active material, conductive aid, binder, and other ingredients.

The positive electrode active material may be, for example, a lithium transition metal complex oxide such as $Li_xCoO_2$, $Li_xNiO_2$, $Li_xMnO_2$, $Li_xCo_yNi_{1-y}O_2$, $Li_xCo_yM_{1-y}O_2$, $Li_xNi_{1-y}M_yO_2$, $Li_xMn_yNi_xCo_{1-y-z}O_2$, $Li_xMn_2O_4$ or $Li_xMn_{2-y}M_yO_4$. In this lithium transition metal complex oxide, M represents at least one metal element selected from the group consisting of Mg, Mn, Fe, Co, Ni, Cu, Zn, Al and Cr, and $0 \leq x \leq 1.1$, $0 < y < 1.0$ and $2.0 \leq z \leq 2.2$. One such positive electrode active material may be used herein, or two such materials may be combined for use.

The conductive aid of the positive electrodes 5 may be, for example, carbon black, flaky graphite, Ketjen black, acetylene black, fibrous carbon or the like. The binder of the positive electrodes 5 may be, for example, polytetrafluoroethylene (PTFE), polyvinylidene fluoride (PVDF), carboxymethyl cellulose, styrene-butadiene rubber or the like.

A positive electrode 5 may be fabricated by, for example, mixing a positive electrode active material, conductive aid and binder and dispersing the resulting positive electrode compound in water or an organic solvent to prepare a positive electrode compound-containing paste, applying this positive electrode compound-containing paste to one or both sides of the current collector 52 made of metal foil, expanded metal, plain-woven metal wire or the like, drying the resulting product and pressure-forming it. In this case, the binder may be dissolved or dispersed in water or solvent in advance, and then may be mixed with a positive electrode active material and other ingredients to prepare a positive electrode compound-containing paste. However, a method of fabricating a positive electrode 5 is not limited to the one illustrated above, and a positive electrode may be fabricated by other methods.

As the composition of a positive electrode 5, it is preferable to have, for example, in the positive electrode compound forming the positive electrode 5 represented as 100% by mass, the positive electrode active material in 75% to 90% by mass, the conductive aid in 5% to 20% by mass, and the binder in 3% to 15% by mass. Preferably, the thickness of a positive electrode compound layer 51 may be, for example, in the range of 30 μm to 200 μm.

Preferable materials of the current collector 52 of a positive electrode 5 include aluminum, an aluminum alloy or the like. Preferably, the current collector 52 may be metal foil in order to keep the thickness of the positive electrodes 5 small while increasing the number of stacked positive and negative electrodes 5 and 6 in the battery 1 to increase the area where each positive electrode compound layers 51 faces a negative electrode material layers 61 to increase the load characteristics of the battery 1. Preferably, the thickness of the current collector 52 may be, for example, in the range of 8 μm to 20 μm.

The active material of the negative electrodes 6 may contain lithium, a lithium alloy, a carbon material that can occlude and discharge lithium ions or lithium titanate.

Lithium alloys that can be used for the negative electrode active material include, for example, lithium alloys that are made by alloying lithium in a reversible manner, such as lithium-aluminum or lithium-gallium. Preferably, the amount of contained lithium may be, for example, in the range of 1 to 15 atom percent. Carbon materials that can be used for the negative electrode active material include, for example, synthetic graphite, natural graphite, low crystallinity carbon, coke, smokeless coal and the like.

A preferred type of lithium titanate that can be used for the negative electrode active material is represented by the general formula $Li_xTi_yO_4$ and has stoichiometric values for x and y of $0.8 \leq x \leq 1.4$ and $1.6 \leq y \leq 2.2$, and particularly preferably has stoichiometric values of x=1.33 and y=1.67. Lithium titanate represented by the general formula $Li_xTi_yO_4$ can be provided by, for example, thermally treating titanium oxide and a lithium compound at 760° C. to 1100° C. The titanium oxide may be anatase-type or rutile-type, and the lithium compound may be, for example, lithium hydroxide, lithium carbonate, lithium oxide or the like.

If the negative electrode active material is lithium or a lithium alloy, a negative electrode 6 may be provided by pressure-bonding lithium or a lithium alloy to a current collector 62, such as woven metal wire, and then forming a negative electrode material layer 61 made of lithium or a lithium alloy and other ingredients on the surface of the current collector 62. If the negative electrode active material is a carbon material or lithium titanate, then, for example, a carbon material or lithium titanate and binder for the negative electrode active material and, where necessary, a conductive aid are mixed together, and the resulting negative electrode compound is dispersed in water or organic solvent to prepare a negative electrode compound-containing paste. Then, this negative electrode compound-containing paste is applied to a current collector 62 composed of metal foil, expanded metal, plain-woven metal wire or the like, and the resulting product is dried before being pressure-formed to form a negative electrode material layer 61 (including a negative electrode compound layer; the same applies hereinafter). In this case, the binder may be dissolved or dispersed in water or solvent in advance, and the solution is mixed together with a negative electrode active material and other ingredients to prepare a negative electrode compound-containing paste. However, a method of fabricating a negative electrode 6 is not limited to the method illustrated above, and a negative electrode may be fabricated by other methods.

For the binder and conductive aid of the negative electrodes 6, those binders and conductive aids listed above for the positive electrodes 5 can be used.

As the composition of the negative electrodes 6 if a carbon material is used for the negative electrode active material, it is preferable to have, for example, in the negative electrode compound forming the negative electrodes 6 represented as 100% by mass, the carbon material in 80% to 95% by mass and the binder in 3% to 15% by mass and, if a conductive aid is also used, it is preferable to have the conductive aid in 5% to 20% by mass.

As the composition of the negative electrodes 6 if lithium titanate is used for the negative electrode active material, it is preferable to have, for example, in the negative electrode compound forming the negative electrodes 6 represented as 100% by mass, lithium titanate in 75% to 90% by mass and the binder in 3% to 15% by mass. If a conductive aid is also used, it is preferable to have the conductive aid in 5% to 20% by mass.

Preferably, the thickness of a negative electrode material layer 61 of a negative electrode 6 may be, for example, in the range of 40 μm to 200 μm.

Preferably, the material of the current collector 62 of a negative electrode 6 is copper or a copper alloy. Preferably, the current collector 62 may be metal foil in order to keep the thickness of a negative electrode 6 small while increasing the number of stacked positive and negative electrodes 5 and 6 in the battery 1 to increase the area where each positive electrode compound layer 51 faces a negative electrode material layer 61 to increase the load characteristics of the battery 1. Preferably, the thickness of the current collector 62 may be, for example, in the range of 5 μm to 30 μm.

As discussed above, a separator 7 may be a component made of microporous membrane of a thermoplastic resin. Preferable thermoplastic resins that may form the separator 7 include, for example, a polyolefin such as polyethylene (PE), polypropylene (PP), ethylene-propylene copolymer or polymethylpentene. To facilitate welding separators 7 together or disposing the same resin as that forming the separators 7 between the separators 7 and welding them together, a polyolefin is more preferable that has the melting temperature of that resin, i.e. a melting temperature in the range of 100° C. to 180° C. as measured by a differential scanning calorimeter (DSC) conforming to the provisions of JIS K 7121.

The microporous membrane of thermoplastic resin forming the separators 7 may be in any form that has an ion conductivity that provides the required battery characteristics. For example, ion-permeable microporous membrane with multiple holes made by a known solvent extraction process or dry or wet drawing process or the like, widely used for separators of batteries, is preferable.

Preferably, the thickness of a separator 7 may be, for example, in the range of 5 μm to 25 μm. Preferably, the hole ratio may be, for example, in the range of 30 to 70%.

Preferably, the positive electrodes 5, negative electrodes 6 and separators 7 are disposed such that the current collector tabs 5b of the positive electrodes 5 extend in the same direction in planar view of the electrode assembly and that the current collector tabs 6b of the negative electrodes 6 extend in the same direction in planar view of the electrode assembly. This will achieve a current collecting structure of the positive electrodes 5 and negative electrodes 6 with a simple configuration.

In addition, as shown in FIG. 4, it is more preferable that the set of current collector tabs 5b and the set of current collector tabs 6b are disposed on the opposite sides of the battery in planar view in order that the set of current collector tabs 5b of the positive electrodes 5 and the set of current collector tabs 6b of the negative electrodes 6 are not in contact with each other, thereby improving the productivity of the battery.

Preferably, as shown in FIG. 4, the electrode assembly composed of positive electrodes 5, negative electrodes 6 and separators 7 is bound together externally by a binding tape 9 made of chemical-resistant polypropylene or the like. This will prevent positional displacement of the components (i.e. the positive electrodes 5 covered with the separators 7, and the negative electrodes 6).

A plurality of positive electrodes 5 and a plurality of negative electrodes 6 form the electrode assembly. The total number of electrode layers is at least four (4), and may be greater (such as 5, 6, 7, and 8). However, since an excessively large number of stacked positive electrode 5 and negative electrode 6 layers may diminish the advantages of being a flat battery, it is generally preferable that the number of layers is not greater than 40.

The nonaqueous electrolyte may be prepared by, for example, dissolving an electrolyte (i.e. a lithium salt) in an organic solvent such as a cyclic carbonate such as ethylene carbonate (EC), propylene carbonate, butylene carbonate, or vinylene carbonate; a chain carbonate such as dimethyl carbonate, diethyl carbonate (DEC), or methyl-ethyl carbonate; or an ether such as 1,2-dimethoxyethane, diglyme(diethylene glycol methyl ether), triglyme(triethylene glycol dimethyl ether), tetragylme(tetraethylene glycol dimethyl ether), 1,2-dimethoxyethane, 1,2-diethoxymethane or tetrahydrofuran in a concentration of 0.3 mol/L to 2.0 mol/L. One such organic solvent may be used herein, or two or more such solvents may be combined for use.

The electrolyte may be a lithium salt such as $LiBF_4$, $LiPF_6$, $LiAsF_6$, $LiSbF_6$, $LiClO_4$, $LiCF_3SO_3$, $LiC_4F_9SO_3$, $LiN(CF_3SO_2)_2$, or $LiN(C_2F_5SO_2)_2$.

The planar shape of the flat nonaqueous secondary battery 1 is not limited to a particular one, and may be circular, as is common with known flat batteries, or polygonal with angles (such as rectangular). Polygons with angles as planar shapes of the battery 1 of the present specification include such shapes with their angles cut off or such shapes with their angles rounded off. The planar shape of each of the bodies 5a and 6a of the positive electrodes 5 and negative electrodes 6 may conform to the planar shape of the battery 1. The bodies 5a and 6a may be generally circular, or may be polygonal, including quadrangular such as rectangular or square. If the bodies 5a and 6a are generally circular, for example, portions thereof where the current collector tabs of their respective opposite pole are disposed may preferably be cut off, as shown in FIG. 3, to prevent those portions from being in contact with the current collector tabs of their respective opposite pole.

FIGS. 1, 2, 6 and 7 illustrate implementations where the exterior case 2 is a positive electrode case and the seal case 3 is a negative electrode case; however, the present invention is not limited to this arrangement and, where necessary, the exterior case 2 may be a negative electrode case and the seal case 3 may be a positive electrode case.

In the description above, for each positive electrode, two separators 7 are joined together at the peripheries of the bodies 7a; however, one separator may be folded and joined to itself.

Positive electrodes 5 of the shape shown in FIG. 3 and a separator 7 of the shape shown in FIG. 4 were used to manufacture a flat nonaqueous secondary battery where A was 300 μm and B (thickness of a positive electrode) was 140 μm (i.e. the A/B value is 2.14) and the positive electrodes 5 and separators 7 had the configuration shown in FIG. 8. More particularly, a flat nonaqueous secondary battery with the configuration shown in FIGS. 6 and 7 and having an inner angle $C_1$ of 65°, an inner angle $C_2$ of 90° and an inner angle D of 25°, was manufactured. This flat nonaqueous secondary battery was disassembled, and no damage to the inner surface of a separator or a chip-off of a corner of a positive electrode compound layer in the areas enclosed by the circles in FIG. 8(a) was found. Thus, a flat nonaqueous secondary battery with improved reliability was manufactured efficiently.

The flat nonaqueous secondary battery 1 can be used in applications similar to those of known flat nonaqueous secondary batteries.

The invention claimed is:

1. A flat nonaqueous secondary battery, comprising:
   an exterior case having an opening, the exterior case serving as a positive terminal;
   a seal case fitted with the opening, the seal case serving as a negative terminal;
   an insulating gasket provided between the exterior case and the seal case, the exterior case being insulate from the seal case,
   an electrode assembly disposed in a space formed by the exterior case and the seal case,
   the electrode assembly including:
   a plurality of positive electrodes and a plurality of negative electrodes alternately stacked upon each other, each positive electrode including a positive electrode body and a positive electrode current collector tab protruding from the positive electrode body in planar view, the positive electrode current collector tabs connected with each other, an inner surface of the exterior case being electrically connected to the positive electrode current collector tabs such that an outer surface of the exterior case serves as the positive terminal, an inner surface of the seal case being electrically connected to the negative electrodes such that the seal case serves as the negative terminal; and
   separators made of microporous membrane of a thermoplastic resin, each of the separators being located between one of the positive electrodes and one of the negative electrodes, each separator being disposed to sandwich and cover one of the positive electrodes,
   the separator as sandwiching the positive electrode having a joint formed by welding together at least a portion of a periphery of the separator,
   the positive electrode current collector tab extending toward the outside of the separator,
   the exterior case serving as a positive terminal is electrically connected to the positive electrodes through the connected positive electrode current collector tabs,
   wherein, when the separator and the positive electrode are measured along a cross section in their thickness direction, a ratio A/B of a shortest distance A between an end of the joint of the separator, the end facing the positive electrode, and an outer peripheral surface of the positive electrode sandwiched by the separator to a thickness B of the electrode is not smaller than 1.

2. The flat nonaqueous secondary battery according to claim 1, wherein the ratio A/B is not greater than 5.

3. The flat nonaqueous secondary battery according to claim 1, wherein each separator disposed to sandwich one of the positive electrodes is disposed relative to this positive electrode such that a space with a triangular cross section is formed, between the separator and the positive electrode, by the end of the joint of the separator, the end facing the positive electrode, and the outer periphery of the positive electrode sandwiched by the separator when the separator and the positive electrodes are measured along a cross section in their thickness direction, and when the separator and the positive electrode are measured along a cross section in their thickness direction, an inner angle formed by a side "a" extending in a thickness direction of the positive electrode along the periphery of the positive electrode and a side "b" connecting one end of the periphery of the positive electrode in the thickness direction with the end of the joint of the separator, and an inner angle formed by the side "a" and a side "c" connecting another end of the periphery of the positive electrode in the thickness direction with the end of the joint of the separator are not smaller than 45°.

4. The flat nonaqueous secondary battery according to claim 1, wherein one of the separators disposed to sandwich the positive electrode extend generally parallel to the positive electrode.

5. The flat nonaqueous secondary battery according to claim 4, wherein the electrode assembly has a plurality of separators, and each of the separators extending generally parallel to the positive electrodes are disposed on one and the same side of its positive electrode of a side close to the exterior case and a side close to the seal case.

6. The flat nonaqueous secondary battery according to claim 5, wherein each separator disposed to sandwich one of the positive electrodes is disposed relative to this positive electrode such that a space with a triangular cross section is formed, between the separator and the positive electrode, by the end of the joint of the separator, the end facing the positive electrode, and the outer periphery of the positive electrode sandwiched by the separator when the separator and the positive electrodes are measured along a cross section in their thickness direction, and when the separator and the positive electrode are measured along a cross section in their thickness direction, out of an inner angle formed by a side "a" extending in a thickness direction of the positive electrode along the periphery of the positive electrode and a side "b" connecting one end of the periphery of the positive electrode with the end of the joint of the separator, and an inner angle formed by the side "a" and a side "c" connecting another end of the periphery of the positive electrode with the end of the joint of the separator, one is 90° and another is not smaller than 45°.

7. The flat nonaqueous secondary battery according to claim 1, wherein the flat nonaqueous secondary battery is a coin cell or a button cell.

8. A flat nonaqueous secondary battery, comprising:
an exterior case having an opening, the exterior case serving as a negative terminal;
a seal case fitted with the opening, the seal case serving as a positive terminal;
an insulating gasket provided between the exterior case and the seal case, the exterior case being insulate from the seal case,
an electrode assembly disposed in a space formed by the exterior case and the seal case,
the electrode assembly including:
a plurality of positive electrodes and a plurality of negative electrodes alternately stacked upon each other, each positive electrode including a positive electrode body and a positive electrode current collector tab protruding from the positive electrode body in planar view, the positive electrode current collector tabs connected with each other, an inner surface of the exterior case being electrically connected to the negative electrode current collector tabs such that an outer surface of the exterior case serves as the negative terminal, an inner surface of the seal case being electrically connected to the positive electrodes such that the seal case serves as the positive terminal; and separators made of microporous membrane of a thermoplastic resin, each of the separators being located between one of the positive electrodes and one of the negative electrodes, each separator being disposed to sandwich and cover one of the positive electrodes,
the separator as sandwiching the positive electrode having a joint formed by welding together at least a portion of a periphery of the separator,
the positive electrode current collector tab extending toward the outside of the separator,
the seal case serving as a positive terminal is electrically connected to the positive electrodes through the connected positive electrode current collector tabs,
wherein, when the separator and the positive electrode are measured along a cross section in their thickness direction, a ratio A/B of a shortest distance A between an end of the joint of the separator, the end facing the positive electrode, and an outer peripheral surface of the positive electrode sandwiched by the separator to a thickness B of the electrode is not smaller than 1.

9. The flat nonaqueous secondary battery according to claim 8, wherein the ratio A/B is not greater than 5.

10. The flat nonaqueous secondary battery according to claim 8, wherein each separator disposed to sandwich one of the positive electrodes is disposed relative to this positive electrode such that a space with a triangular cross section is formed, between the separator and the positive electrode, by the end of the joint of the separator, the end facing the positive electrode, and the outer periphery of the positive electrode sandwiched by the separator when the separator and the positive electrodes are measured along a cross section in their thickness direction, and when the separator and the positive electrode are measured along a cross section in their thickness direction, an inner angle formed by a side "a" extending in a thickness direction of the positive electrode along the periphery of the positive electrode and a side "b" connecting one end of the periphery of the positive electrode in the thickness direction with the end of the joint of the separator, and an inner angle formed by the side "a" and a side "c" connecting another end of the periphery of the positive electrode in the thickness direction with the end of the joint of the separator are not smaller than 45°.

11. The flat nonaqueous secondary battery according to claim 8, wherein one of the separators disposed to sandwich the positive electrode extend generally parallel to the positive electrode.

12. The flat nonaqueous secondary battery according to claim 11, wherein the electrode assembly has a plurality of separators, and each of the separators extending generally parallel to the positive electrodes are disposed on one and the same side of its positive electrode of a side close to the exterior case and a side close to the seal case.

13. The flat nonaqueous secondary battery according to claim 12, wherein each separator disposed to sandwich one of the positive electrodes is disposed relative to this positive electrode such that a space with a triangular cross section is formed, between the separator and the positive electrode, by the end of the joint of the separator, the end facing the positive electrode, and the outer periphery of the positive electrode sandwiched by the separator when the separator and the positive electrodes are measured along a cross section in their thickness direction, and when the separator and the positive electrode are measured along a cross section in their thickness direction, out of an inner angle formed by a side "a" extending in a thickness direction of the positive electrode along the periphery of the positive electrode and a side "b" connecting one end of the periphery of the positive electrode with the end of the joint of the separator, and an inner angle formed by the side "a" and a side "c" connecting another end of the periphery of the positive electrode with the end of the joint of the separator, one is 90° and another is not smaller than 45°.

14. The flat nonaqueous secondary battery according to claim 8, wherein the flat nonaqueous secondary battery is a coin cell or a button cell.

\* \* \* \* \*